(12) United States Patent
Yahagi

(10) Patent No.: US 6,973,046 B2
(45) Date of Patent: Dec. 6, 2005

(54) USER FEE CHARGING SYSTEM IN WHICH TRAFFIC IS DETERMINED THROUGH SAMPLING OPERATION

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 684 days.

(21) Appl. No.: 09/877,018

(22) Filed: Jun. 11, 2001

(65) Prior Publication Data
US 2001/0050904 A1    Dec. 13, 2001

(30) Foreign Application Priority Data
Jun. 12, 2000   (JP)   ............... 2000-175675

(51) Int. Cl.[7] ............................................. H04L 12/56
(52) U.S. Cl. ................................. 370/252; 379/114.01
(58) Field of Search ....................... 370/252, 254, 370/235, 468, 253; 379/114.01, 114.1, 133

(56) References Cited

U.S. PATENT DOCUMENTS

| | | | |
|---|---|---|---|
| 5,142,653 A | | 8/1992 | Schefts |
| 5,751,799 A | * | 5/1998 | Mori ..................... 379/114.09 |
| 5,828,737 A | * | 10/1998 | Sawyer .................. 379/114.07 |
| 5,913,074 A | * | 6/1999 | Ikeda et al. .................... 710/29 |
| 5,953,330 A | * | 9/1999 | Canniff et al. ............... 370/352 |
| 5,953,334 A | * | 9/1999 | Morita et al. ............... 370/389 |
| 6,084,854 A | * | 7/2000 | Uno et al. ................... 370/232 |
| 6,615,260 B1 | * | 9/2003 | Honda et al. ............... 709/224 |
| 2001/0038625 A1 | * | 11/2001 | Satoh ........................ 370/352 |

FOREIGN PATENT DOCUMENTS

| | | |
|---|---|---|
| EP | 0 539 016 A2 | 9/1992 |
| JP | 5-48602 | 2/1993 |
| JP | 10-178423 | 6/1998 |
| JP | 10-257465 | 9/1998 |

OTHER PUBLICATIONS

Martin De Rycker: 1994, Prentice Hall, XP002324498 ISBN: 3-930436-03-5, p. 99, p. 145.

* cited by examiner

Primary Examiner—Chau Nguyen
Assistant Examiner—Zewdu Habte
(74) Attorney, Agent, or Firm—Foley & Lardner LLP

(57) ABSTRACT

A communication fee charging system includes a switching apparatus a measuring unit a summing unit and a generating unit. The switching apparatus connects a subscriber terminal with at least one counter terminal. The measuring unit measures one of a number of channels and a band quantity occupied in the connection between the subscriber terminal and the at least one counter terminal in response to a measurement start signal, to output a measurement result. The summing unit sums the measurement result. The generating unit outputs the measurement start signal to the measuring unit.

16 Claims, 11 Drawing Sheets

USER FEE CHARGING SYSTEM IN WHICH TRAFFIC IS DETERMINED THROUGH SAMPLING OPERATION

BACKGROUND OF THE INVENTION

1. Field of the Invention

The present invention is related a fee charging method and apparatus, and more particularly to a fee charging method and apparatus for a line switching call or a packet switching call.

2. Description of the Related Art

Figure 1:
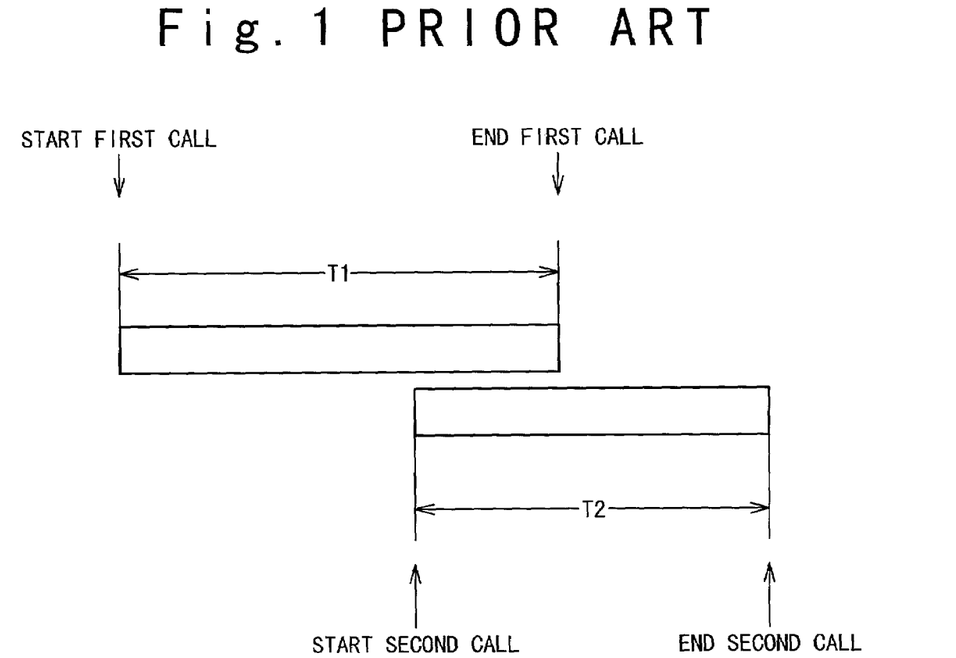
FIG. 1 shows a conventional fee charging system for a line switching call.

A conventional fee charging system for a line switching call will be described with reference to FIG. 1. In FIG. 1, a case is exemplified in which a first user sends a first call to a second user. The first user sends a second call to a third user before the communication with the second user is ended. Then, the second call with the third user is ended after the first call with the second user is ended. This is so-called three persons communication. In this case, in the conventional fee charging system, a communication fee is determined based on a summation of the time interval "T1" from the start of the first call to the end of the first call and the time interval "T2" from the start of the second call to the end of the second call.

Figure 2:
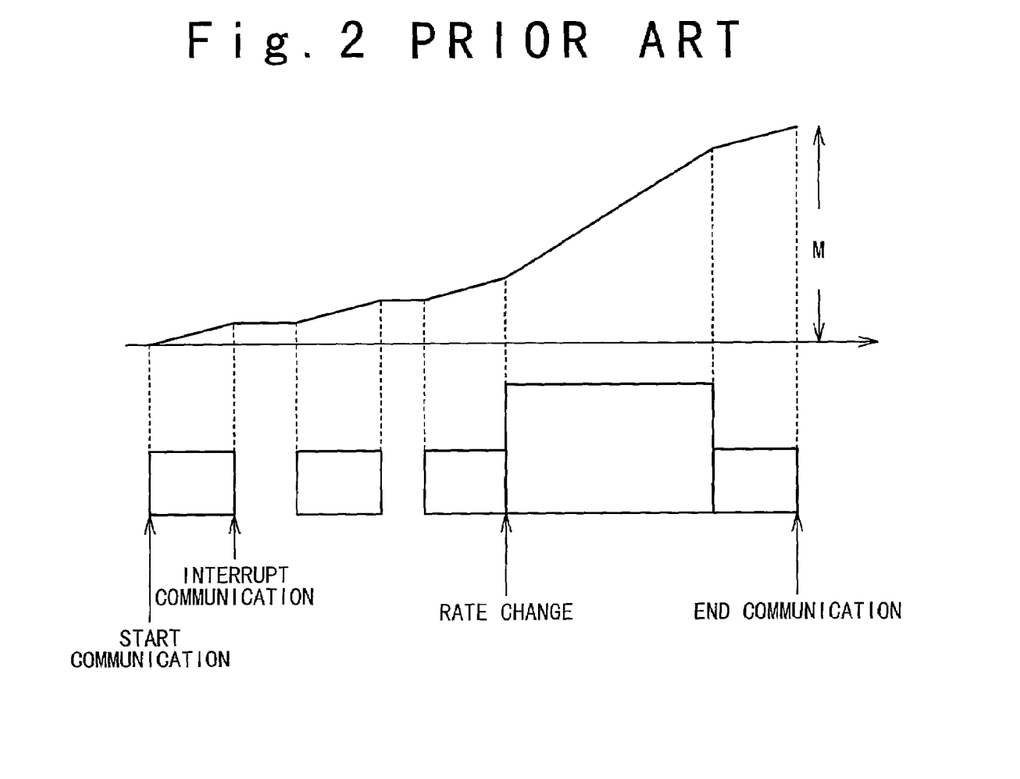
FIG. 2 shows another conventional fee charging system for a packet switching call.

Also, another conventional fee charging system for a packet switching call will be described with reference to FIG. 2. In FIG. 2, a case is exemplified in which a first user originates a packet switching call to a second user. In case of the packet call, the communication is interrupted based on existence or non-existence of transfer data and the transfer rate of the transfer data sometimes changes. In such a case, the communication time is not a time interval from when the packet switching call is originated to when it is ended. Therefore, the communication fee is determined based on a quantity of transfer data during the communication. This is so-called data quantity dependent fee. The communication fee to be paid by the user is determined based on this method. In FIG. 2, the quantity of transfer data "M" summed from the communication start time is collected at the time of the communication end. The summed value is used as account data.

In the convention fee charging system, there are some problems.

The fee charging system shown in FIG. 1 adopts a method in which the communication fee is determined based on the start time and the end time. Therefore, appropriate account data cannot be obtained in accordance with a quantity of transfer data by the user when the rate of user data is changed during the communication. That is, the fee charging system is adopted in which the communication time is multiplied by the communication rate which has been declared by the user. When the communication rate is high during the communication time, an average data transfer rate would be higher than the communication rate declared. In this case, the resources of a communication system have been excessively used more than the observed quantity of transfer data. On the other hand, when the communication rate is low during the communication, the average data transfer rate is lower than the above declared communication rate. In this case, if the account data is determined by multiplying the communication time by the communication unit price, the excessive fee is charged to the user, because the resources of the communications system are only used lower than the declared quantity.

Also, in the fee charging system shown in FIG. 1, a plurality of account data have been generated when the user originates the plurality of calls, so that the account data increase. Because the user is only one, the account data can be determined based on the system resources occupied during the time interval from the communication start to the communication end.

Also, when the data transfer rate is different temporally in the line switching call, the quantity of transfer data from the communication start to the communication end is evaluated in the fee charging system shown in FIG. 2. Therefore, the mechanism for measuring the quantity of transfer declared during the communication is required.

In conjunction with the above description, a fee charging system for a high rate data communication is disclosed in Japanese Laid Open Patent application (JP-A-Heisei 5-48602). In this reference, a separation calculation section (1) is provided to carry out separation and extraction of a transmitter ID and a receiver ID and calculation of the number of cells in the signal in parallel from a transfer signal of data communication. A classification summation section (2) previously registers the transmitter ID and receiver ID, checks the separated and extracted ID and the registered ID, and adding the number of counted cells when they are coincident with each other. The ID registered on the classification summation section (2) may be the ID of the transmitter or receiver with high use frequency. Also, a low rate classification summation section may be provided for the transmitters and receivers other than the transmitter or receiver with high use frequency. That is, the high rate communication data is separated by a high-rate separation calculation section (1) and the number of cells is measured and the measuring result is summed by high-rate classification summation means (2). On the other hand, the number of transfer cells of the transmitter and the addressee with low use frequency may be summed in software by a low-rate summation section (3), like a conventional system.

SUMMARY OF THE INVENTION

Therefore, an object of the present invention is to provide a communication fee charging method and system, in which a quantity of transfer data is statistically measured when the quantity of transfer data changes temporally, and determines account data based on the measured quantity of transfer data.

Another object of the present invention is to provide a communication fee charging method and system, in which account data for a line switching call and a packet switching call is determined based on same fee charging principle.

In an aspect of the present invention, a communication fee charging system includes a switching apparatus (201, 202) which connects a subscriber terminal with at least one counter terminal, a measuring unit (211, 212) connected to the switching apparatus to measure one of a number of channels and a band quantity occupied in the connection between the subscriber terminal and the at least one counter terminal in response to a measurement start signal, to output a measurement result, a summing unit (221, 222) connected to the measuring unit to sum the measurement result, and a generating unit (231, 232) connected to the measuring unit to output the measurement start signal to the measuring unit.

The generating unit may output the measurement start signal periodically to the measuring unit. Instead, the generating unit may output the measurement start signal randomly to the measuring unit.

Also, the measuring unit may measure the number of channels when a line switching call is originated from the subscriber terminal. Instead, the measuring unit may measure the band quantity when a packet switching call is originated from the subscriber terminal.

Also, the measuring unit scans channels or bands which are accommodated in the switching apparatus and are used currently at least, in response to the measurement start signal to measure one of the number of channels and the band quantity.

Also, the subscriber terminal and the counter terminal may be speech terminals, or data terminals.

Also, when a plurality of switching apparatuses are provided between the subscriber terminal and the counter terminal, a set of the measuring unit, the summing unit and the generating unit is provided each of the plurality of switching apparatus. In this case, the communication fee charging system may further include a unit (401) which collects the summation from each of the summing units of the sets.

In another aspect of the present invention, a communication fee charging method is achieved by (a) establishing a connection between a subscriber terminal and at least one counter terminal by a switching apparatus in a call from the subscriber terminal; by (b) generating a measurement start signal; by (c) measuring one of a number of channels and a band quantity occupied in the connection in response to the measurement start signal; and by (d) summing the measurement result.

Also, the (b) generating step may be achieved by generating the measurement start signal periodically or randomly.

Also, the (c) measuring step may be achieved by measuring the number of channels when a line switching call is originated from the subscriber terminal, or measuring the band quantity when a packet switching call is originated from the subscriber terminal.

Also, the (c) measuring step is desirably achieved by scanning channels or bands which are accommodated in the switching apparatus and are used currently at least, in response to the measurement start signal to measure one of the number of channels and the band quantity.

Also, the subscriber terminal and the counter terminal may be speech terminals or data terminals.

Also, the subscriber terminal is connected with the counter terminal via a plurality of the switching apparatuses, a set of the (b) generating step, the (c) measuring step and the (d) summing step is carried out in conjunction with each of the plurality of switching apparatus. In this case, the communication fee charging method may further includes: collecting the summation from each of the summing units of the sets.

DESCRIPTION OF THE PREFERRED EMBODIMENTS

Next, a communication fee charging system of the present invention will be described with reference to the attached drawings.

Figure 3:
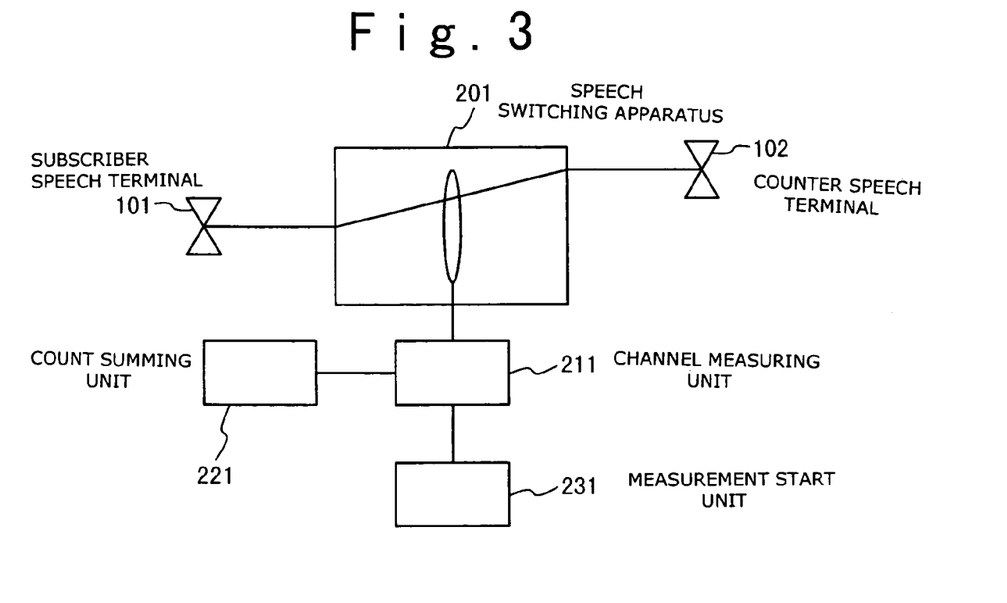
FIG. 3 shows the structure of a communication fee charging method according to a first embodiment of the present invention.

FIG. 3 shows the structure of the fee charging method for a line switching call according to the first embodiment of the present invention. Referring to FIG. 3, a subscriber speech terminal 101 is connected with a counter subscriber speech terminal 102 via a speech switching apparatus 201. A line switching call is originated from the subscriber speech terminal 101 to the counter speech terminal 102. An occupied channel measuring unit 211 is connected with the speech switching apparatus 201 to measure the number of channels occupied by the subscriber speech terminal 101. Also, the occupied channel measuring unit 211 is connected with a count summing unit 221 and a measurement start unit 231. The measurement starting unit 231 generates a measurement start signal periodically for every predetermined time. The measurement start signal is supplied to the occupied channel measuring unit 211. The occupied channel measuring unit 211 measures the number of occupied channels in response to the measurement start signal and outputs the measuring result to the occupied channel summing unit 221. The count summing unit 221 sums the measuring result, i.e., adds the measuring result to a previous addition result. Also, the count summing unit 221 has a function to reply the summed value when the account data of the subscriber terminal 101 is necessary, and a function to reset the summed value, if necessary. In the first embodiment shown in FIG. 3, the speech switching apparatus 201 provides at most one connection channel to the concerned subscriber 101 at a time. The connection channel is counted as "1" in the use state and as "0" in the nonuse state.

Next, the communication fee charging system according to a modification of the first embodiment of the present invention will be described below with reference to FIG. 4.

Figure 4:
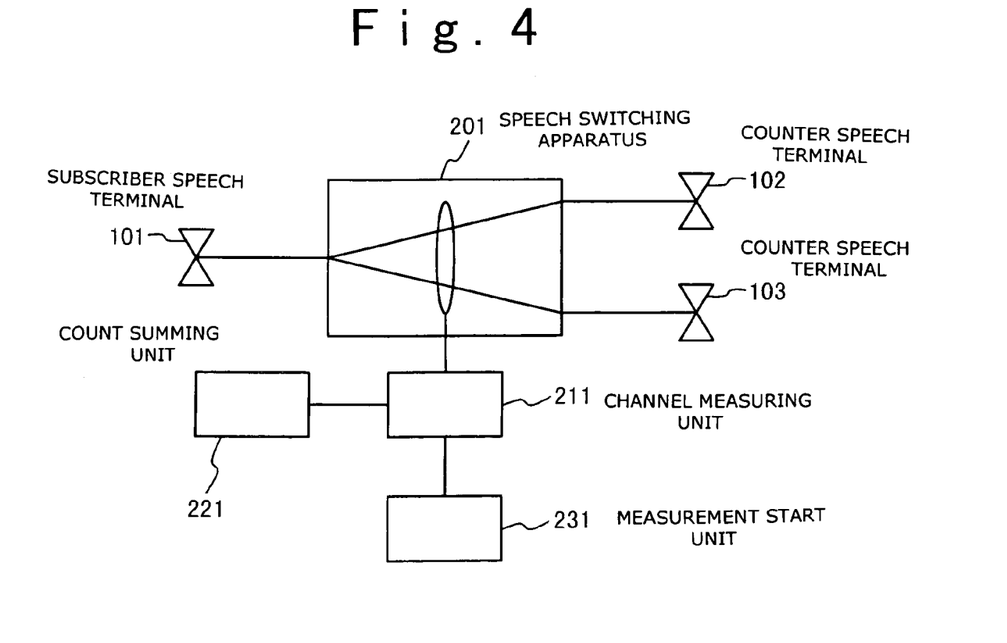
FIG. 4 shows the structure of the communication fee charging system according to a modification of the first embodiment of the present invention.

Referring to FIG. 4, the subscriber speech terminal 101 is connected to a plurality of counter speech terminals 102 and 103 in a conference system. The subscriber speech terminal 101 first starts call origination to the counter speech terminal member 102 and then starts call origination to the counter speech subscriber terminal member 103. Thereafter, the subscriber speech terminal 101 ends the communication with the counter speech terminal 102. Thus, the fee charging system measures the account data in the state in which the subscriber speech terminal 101 communicates with the counter speech terminal 103. In this case, the occupied channel measuring unit 211 measures the occupied channel of one when the subscriber terminal 101 communicates with the counter speech terminal 102. The measuring result is periodically outputted to the count summing unit 221, and summed therein. After that, the occupied channel measuring unit 211 measures the occupied channel of two when the subscriber speech terminal 101 starts to communicate with the counter speech terminal 103 while keeping the connection channel with the counter speech terminal 102. Also, the occupied channel measuring unit 211 measures the occupied channel of one when the subscriber terminal 101 communicates only with the counter subscriber terminal 103. The measuring result is periodically outputted to the count summing unit 221, and summed there.

Figure 5:
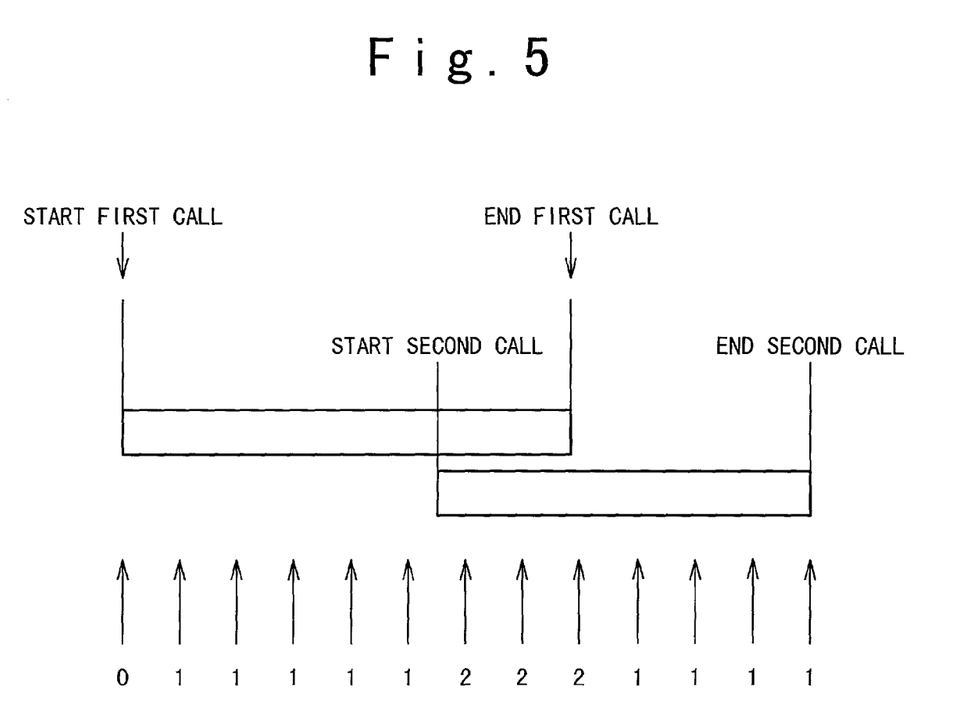
FIG. 5 is a diagram showing a specific example in the he communication fee charging system according to the first embodiment of the present invention.

More specifically, referring to FIG. 5, it is supposed that the subscriber speech terminal 101 originates a line switching call as a first call to the counter speech terminal 102, and another line switching call as a second call to the counter speech terminal 103 during the communication before ending the communication with the counter speech terminal 102.

As a sampling result, because a channel is not occupied in the first sampling interval, the observation value of "0" is detected. After that, the use of the channel for the first call is detected. Only the use of the channel for the first call is detected in the following five sampling intervals, and the observation value of "1" is counted every detection. After that, the second call is originated, and the use of the channel for the first call and the use of the channel for the second call are detected in the following three sampling intervals. The observation value of "2" is counted for every detection. Moreover, the first call is ended, and only the use of the channel for the second call is detected in the following four sampling intervals. In this case, the total observation value of "15" is summed during the 12 sampling intervals. In this way, in the line switching call in the first embodiment, the account data of the observation value of "15" is obtained.

Figure 6:
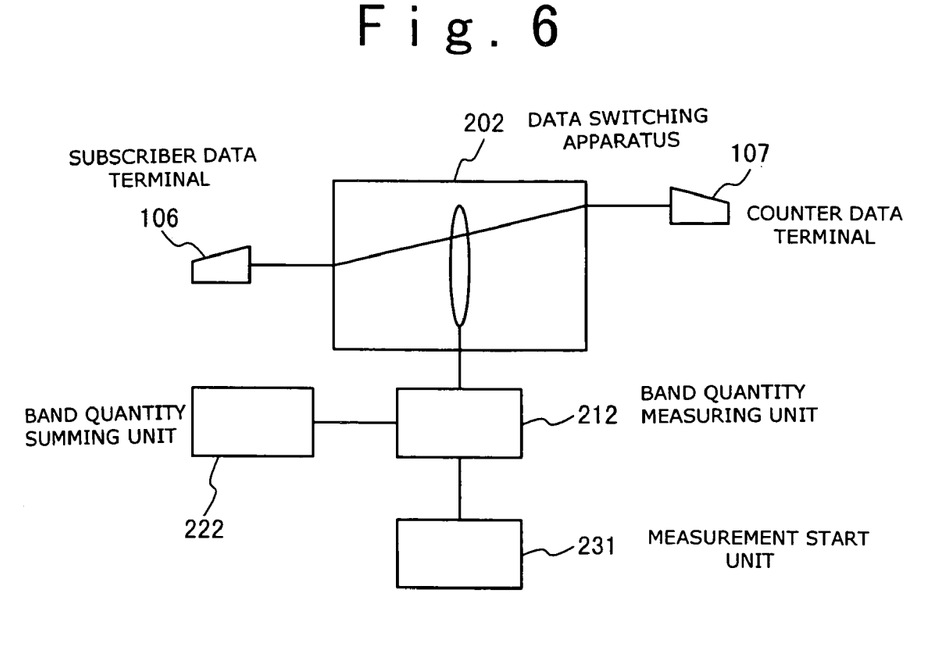
FIG. 6 shows the structure of the communication fee charging system according to the second embodiment of the present invention.

FIG. 6 shows the structure of the fee charging system according to the second embodiment of the present invention. Referring to FIG. 6, a subscriber data terminal 106 is connected with a counter subscriber data terminal 107 via a data switching apparatus 202. An occupied band quantity measuring unit 212 is connected with the data switching apparatus 202 to measure the band quantity occupied by the subscriber data terminal 106, in place of the occupied channel measuring unit 211 in the first embodiment. Also, the occupied band quantity measuring unit 212 is connected with an occupied band quantity summing unit 222 and the measurement start unit 231. The measurement start unit 231 generates a measurement start signal periodically for every predetermined time. The measurement start signal is supplied to the occupied band quantity measuring unit 212. The occupied band quantity measuring unit 212 measures the occupied band quantity in response to the measurement start signal and outputs the measuring result to the occupied band quantity summing unit 222. The occupied band quantity summing unit 221 sums the measuring result, i.e., adds the measuring result to a previous addition result. Also, the occupied band quantity summing unit 222 has a function to reply the summed value when the account data of the concerned subscriber data terminal 105 is necessary, and a function to reset the summed value, if necessary. In the second embodiment shown in FIG. 6, the data switching apparatus 202 connects the subscriber data terminal 106 with at most one subscriber data terminal 107. The data rate of data transferred between the subscriber data terminal 106 and the counter data terminal 107 can be measured, including non-transfer, i.e., data transfer rate of "0". In the fee charging system shown in FIG. 6, the account data can be collected with no relation of the data rate from the subscriber data terminal.

Figure 7:
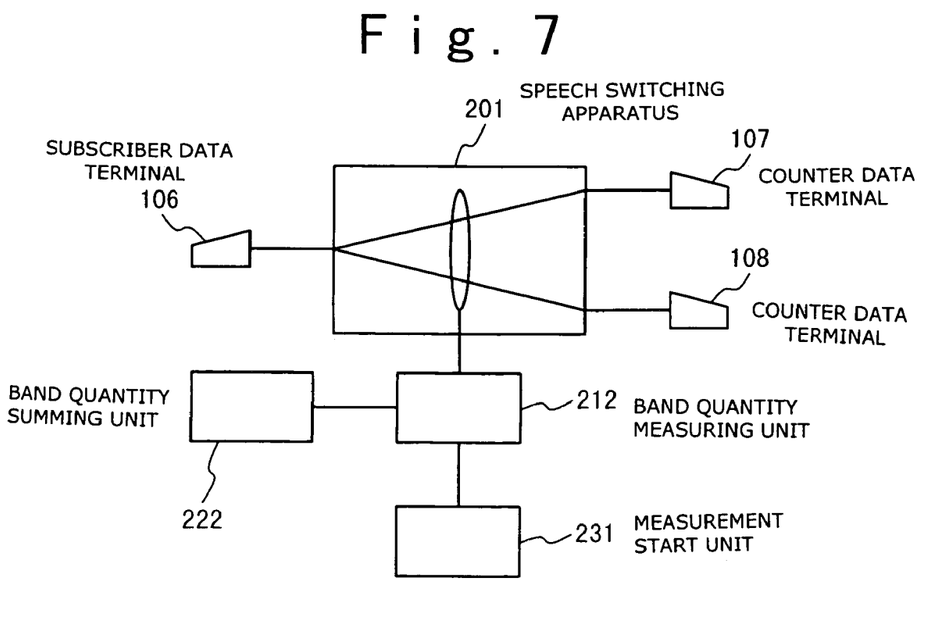
FIG. 7 is a diagram showing the structure of the communication fee charging system according to a modification of the second embodiment of the present invention.

FIG. 7 is similar to the example shown in FIG. 6 and shows a case where the subscriber data terminal 106 has sessions with counter subscriber data terminals 107 and 108. In this case, like the above example, it is not necessary that the subscriber data terminal 106 continuously carries out data transfer. In the second embodiment, the account data can be collected with no relation to the number of counter data terminals 107 and 108 which have sessions with the subscriber data terminal 106.

Figure 8:
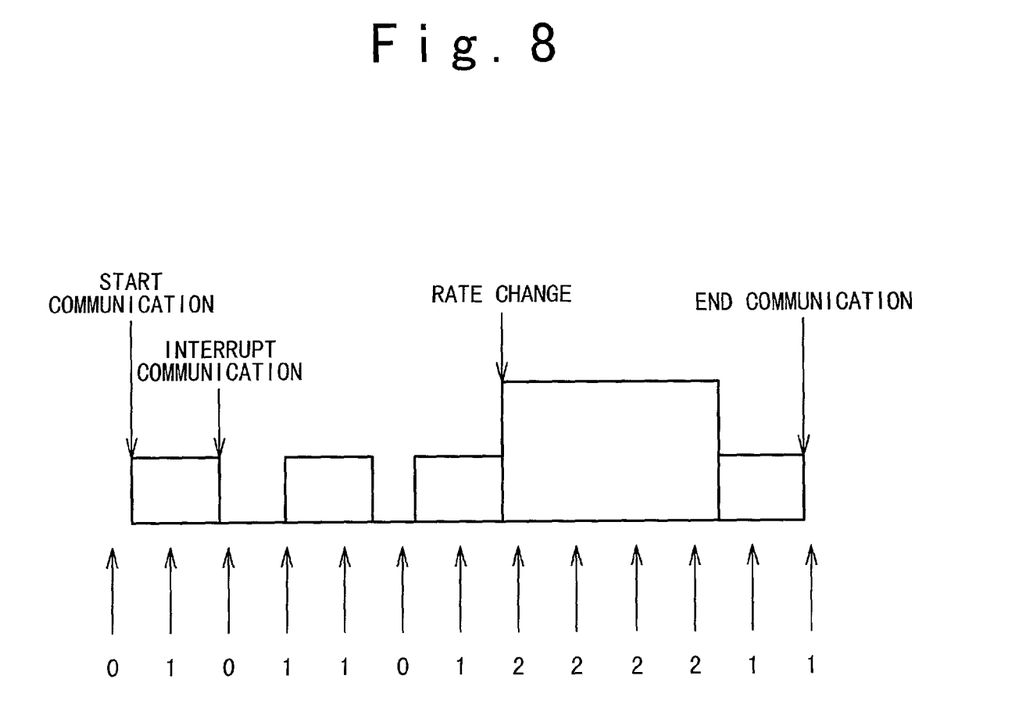
FIG. 8 is a diagram showing a specific example in the communication fee charging system according to the second embodiment of the present invention.

A specific example of the fee charging system for the packet switching call in the second embodiment will be described with reference FIG. 8. As the feature of the packet switching call, there are rate change and non-transmission interval. The quantity of transfer data of the packet switching call is measured in 13 sampling intervals in FIG. 8.

As the sampling result, the observation value of "0" is observed as a scan result for no data to be transferred in the first sampling interval. After that, communication is started and the observation value of "1" is observed to indicate the use of the channel in a unit transfer data quantity in the one sampling interval in a scanning operation to all the channels. After that, the communication is interrupted and the observation value of "0" is observed in the following sampling interval. After that, the communication is restored and the observation value of "1" is observed as the quantity of transfer data in the following two sampling intervals. Moreover, the communication is interrupted again and the observation value of "0" is observed in the following sampling interval of once. After that, the communication is restored and the observation value of "1" is counted as the quantity of transfer data in the following sampling interval. Next, another packet switching call is originated to the counter data terminal 108. As a result, the observation value of "2" is counted as the quantity of transfer data in the subsequent four sampling intervals. Subsequently, the observation value of "1" is counted as the quantity of transfer data in the following two sampling intervals and then communication is ended. In this way, in the packet switching call in the second embodiment, the observation value of "14" is counted as the account data.

In this way, in the present invention, the occupation quantity of the channel and the data transfer quantity on the channel are measured by a sampling operation. Therefore, it is possible to carry out the charged fee measurement in the line switching call and the packet switching call based on the same basic concept.

Next, the communication fee charging system according to the third embodiment of the present invention will be described. The fee charging system in the third embodiment has the same structure as that of the first embodiment. A case would be considered in the third embodiment where the data transfer rate in the line switching call is changed while the communication progresses. It is supposed in the conventional system that the data transfer rate does not change while the line switching call is continued. However, this is because the line switching infrastructure is assumed.

In this case, as the line switching infrastructure could be assumed a case where 64 kbps non-limitation digital bearer is achieved using B channel of 2B+D channels in the ISDN. When the application with the changeable rate is executed using bearer of 64 kbps in this way, change into bearer below 64 kbps is not carried out even if the data transfer rate in this application changes.

As the fee charging system in this case, an accounting process is carried out based on the principle that bearer of 64 kbps is used during how many intervals. In this case, an accounting process is carried out, supposing that the 64 kbps is used even if the application does not fully use the 64 kpbs. This is because the switching infrastructure is structured in consideration of the channel of 64 kbps as the lowest rate unit. It is impossible to divide this into bearers of a lower rate.

However, when the data transfer rate can become smaller than this unit, or when the data transfer rate changes depending on the change of the application, there is a case where the communication infrastructure opens a bearer which is not used by the application to increase the use efficiency of the bearer. In case of use of such a mechanism, the fee charging system is desirable in which the account data is determined based on the quantity of used bearer.

Figure 9:
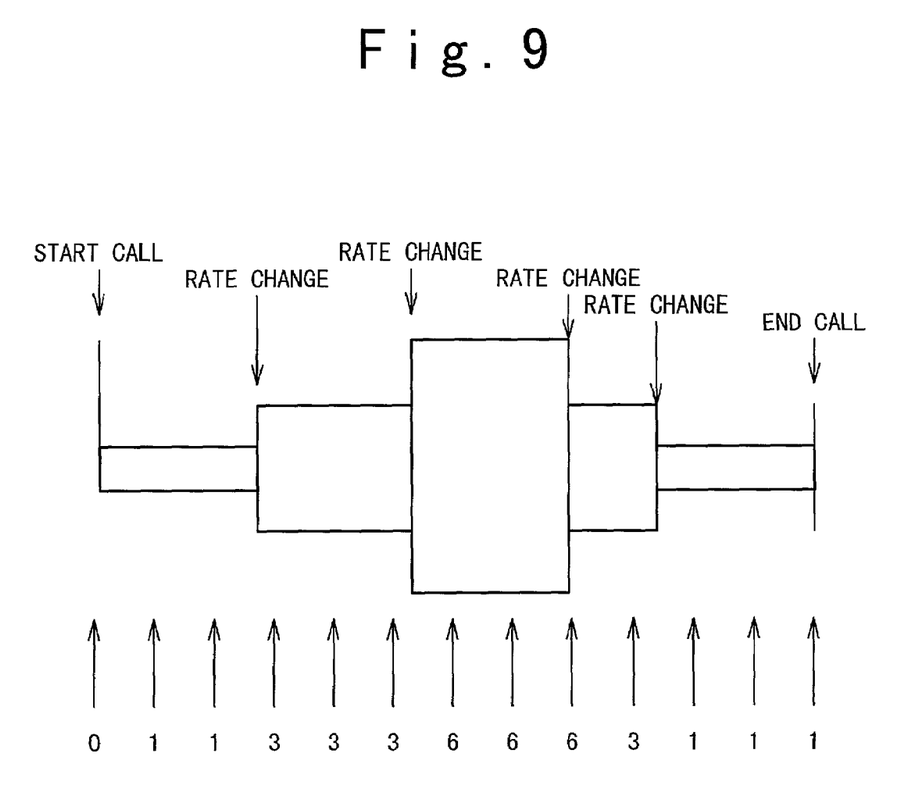
FIG. 9 is a diagram showing another specific example in the communication fee charging system according to the second embodiment of the present invention.

FIG. 9 shows the fee charging system of the line switching call in which the data transfer rate temporally changes as the embodiment of the present invention. As an example where the data transfer rate changes temporally in this way, a case is assumed in which a call is first started in 3.1-KHz speech call and then the application with a higher data rate such as a multimedia telephone, and a TV telephone is used. The quantity of transfer data in the line switching call is measured in the 13 sampling intervals, as shown in FIG. 9. In FIG. 9, a line switching call is started. The observation value of "1" is observed as the quantity of transfer data in the first two sample intervals and the observation value of "3" is observed as the quantity of transfer data in the following three sample intervals. The observation value of "6" is observed as the quantity of transfer data in the following three sample intervals. The observation value of "3" is observed as the quantity of transfer data in the following sample interval. Then, the observation value "1" is observed as the quantity of transfer data in the last three sample intervals. Thus, the communication is ended. In this way, in the packet switching call shown in FIG. 9, the observation value of "35" is counted for the account data.

In this way, in this embodiment, a method of observing the data transfer rate using the sampling method is adopted. Therefore, it is possible to determine the account data even when the data transfer rate of the line switching call changes.

Next the communication fee charging system according to the fourth embodiment of the present invention will be described. Here, it is possible to change a sampling time interval randomly. For example, it is supposed that a generating apparatus of a packet call has an autonomous clock function and generates packet data periodically. In this case, if the sampling period of the fee charging system is synchronous with the generation period of the packet data by the above-mentioned apparatus, there would be a case that the quantity of transfer data is observed less or more. Therefore, such a case can be prevented in this embodiment.

Figure 10:
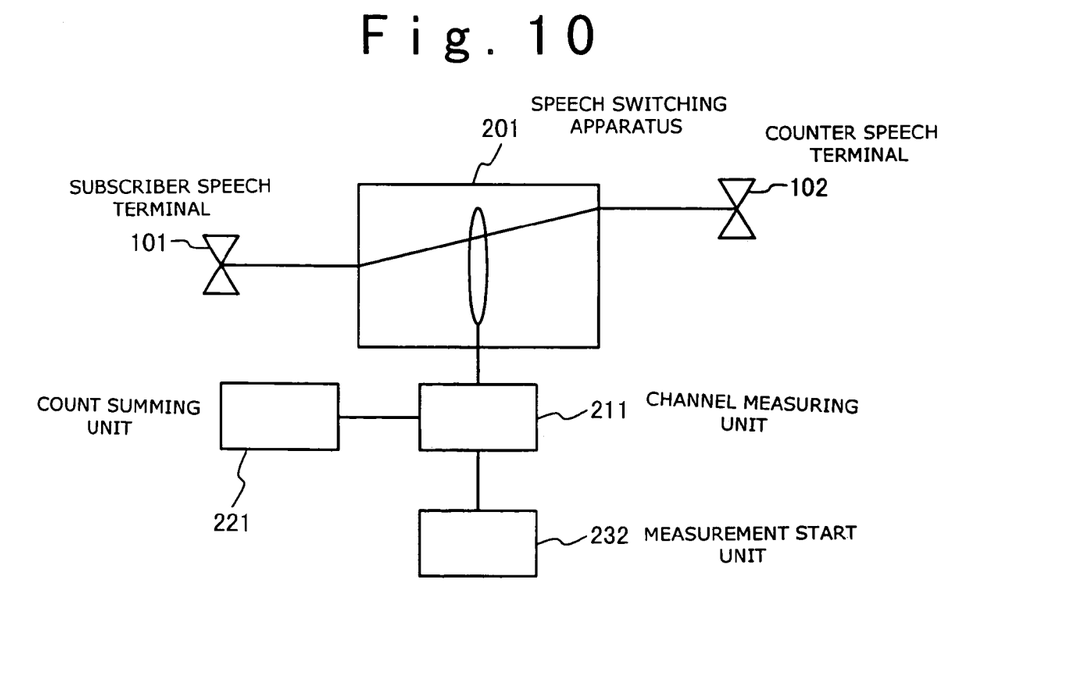
FIG. 10 shows the structure of the communication fee charging system according to the third embodiment of the present invention.

FIG. 10 shows the structure of the fee charging system according to the third embodiment of the present invention. The fee charging system of FIG. 10 is different from that of FIG. 3 in that a measurement start unit 232 is provided to generate the measurement start signal randomly, in place of the measurement starting unit 231. In this example, the measurement start unit 232 generates the measuring start signal randomly. An average of intervals between the measuring start signals is a predetermined value. The occupied channel measuring unit 211 is connected with the speech switching apparatus 201 to measure the number of channels occupied by the subscriber speech terminal 101 in response to the measurement start signal.

Figure 11:
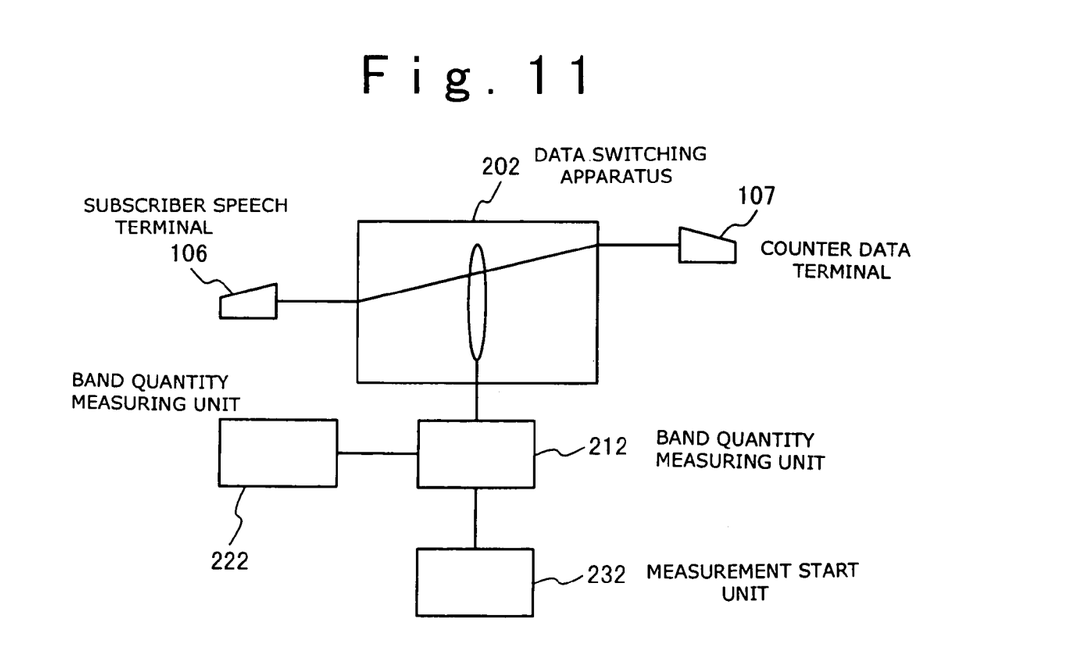
FIG. 11 shows the structure of a modification of the communication fee charging system according to the third embodiment of the present invention.

FIG. 11 shows the structure of a modification of the fee charging system according to the third embodiment of the present invention. The fee charging system of FIG. 11 is different from that of FIG. 6 in that the measurement start unit 232 is provided to generate the measurement start signal randomly, in place of the measurement starting unit 231. In this example, the measurement start unit 232 generates the measurement start signal randomly. An average of intervals between the measurement start signals is a predetermined value. The occupied channel measuring unit 211 is connected with the speech switching apparatus 201 to measure the number of channels occupied by the subscriber speech terminal 101 in response to the measurement start signal.

Figure 12:
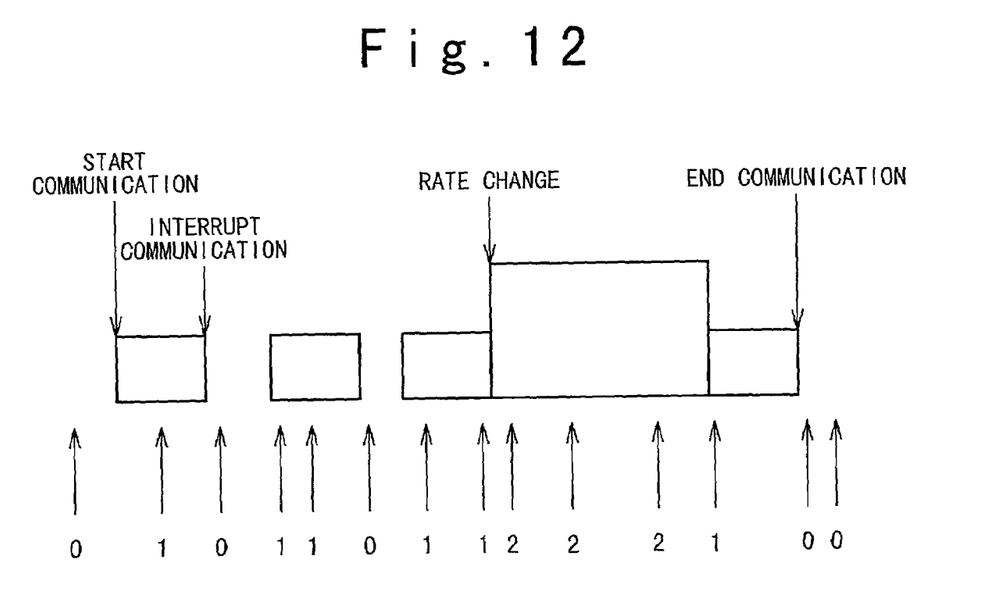
FIG. 12 shows the communication fee charging system according to a modification of the third embodiment of the present invention.

FIG. 12 shows the fee charging system of the packet switching call according to a modification of the third embodiment of the present invention. Referring to FIG. 12, the quantity of transfer data of the packet switching call is measured through the sampling operation of 14 times. Because no data is transferred at the time of first sampling operation, the observation value of "0" is observed as the sampling result. After that, the communication is started and the observation value of "1" is observed as the quantity of transfer data in the one sampling interval. After that, the communication is interrupted, so that the observation value of "0" is observed in the following sampling interval. After that, the communication is restored and the observation value of "1" is observed as the quantity of transfer data in the following two sampling intervals. Moreover, the communication is interrupted again so that the observation value of "0" is observed in the following sampling interval. After that, the communication is restored and the observation value of "1" is observed as the quantity of transfer data in the following two sampling intervals. Subsequently, the observation value of "2" is observed as the quantity of transfer data in the following three sampling intervals, and the observation value of "1" is observed as the quantity of transfer data in the following sampling interval and the communication is ended. In this way, in the packet switching call shown in FIG. 12, the observation value of "12" is counted as the account data.

Figure 13:
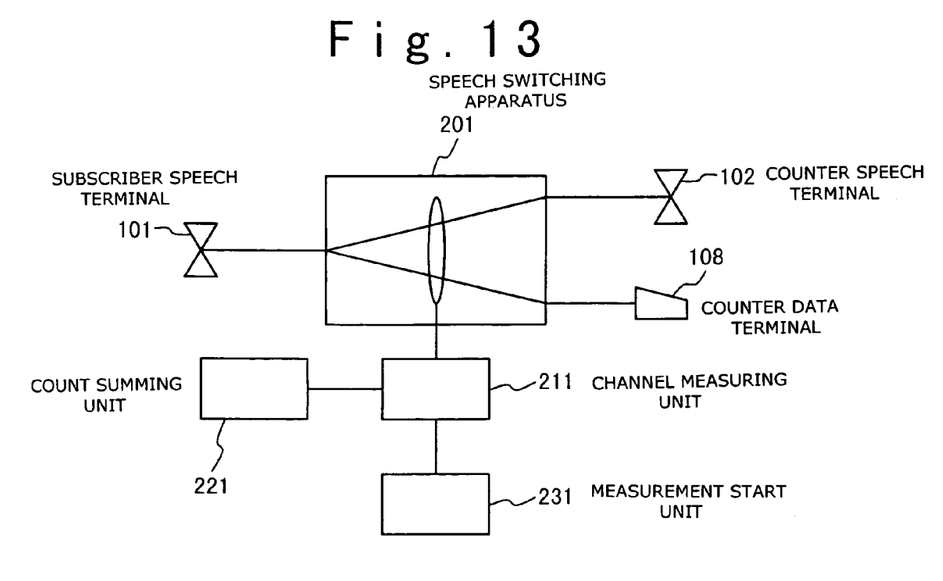
FIG. 13 shows the structure of the communication fee charging system according to the fourth embodiment of the present invention.

FIG. 13 shows the structure of the fee charging system according to the fourth embodiment of the present invention in which a subscriber terminal 101 is connected with a counter speech terminal 102 and a counter data terminal 108. Referring to FIG. 13, a switching apparatus 201 carries out communication connection between the subscriber speech terminal 101 and the counter speech terminal 102. In this case, it is supposed that a mechanism is provided on the terminal side or in the switching apparatus to control different transmission methods of speech and data.

Figure 14:
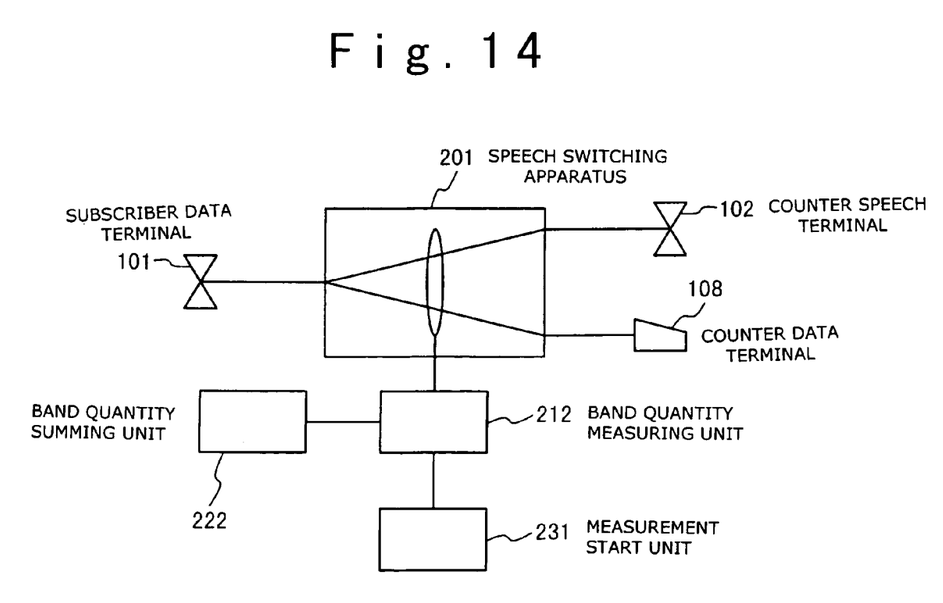
FIG. 14 shows the structure of a modification of the communication fee charging system according to the fourth embodiment of the present invention.

FIG. 14 shows the structure of a modification of the fee charging system according to the fourth embodiment of the present invention in which the subscriber terminal 101 is connected with the counter speech terminal 102 and the counter data terminal 108. Referring to FIG. 14, the switching apparatus 201 carries out communication connection between the subscriber speech terminal 101 and the counter subscriber speech terminal 102. In this case, it is supposed that a mechanism is provided on the terminal side or in the switching apparatus to control different transmission methods of speech and data.

Figure 15:
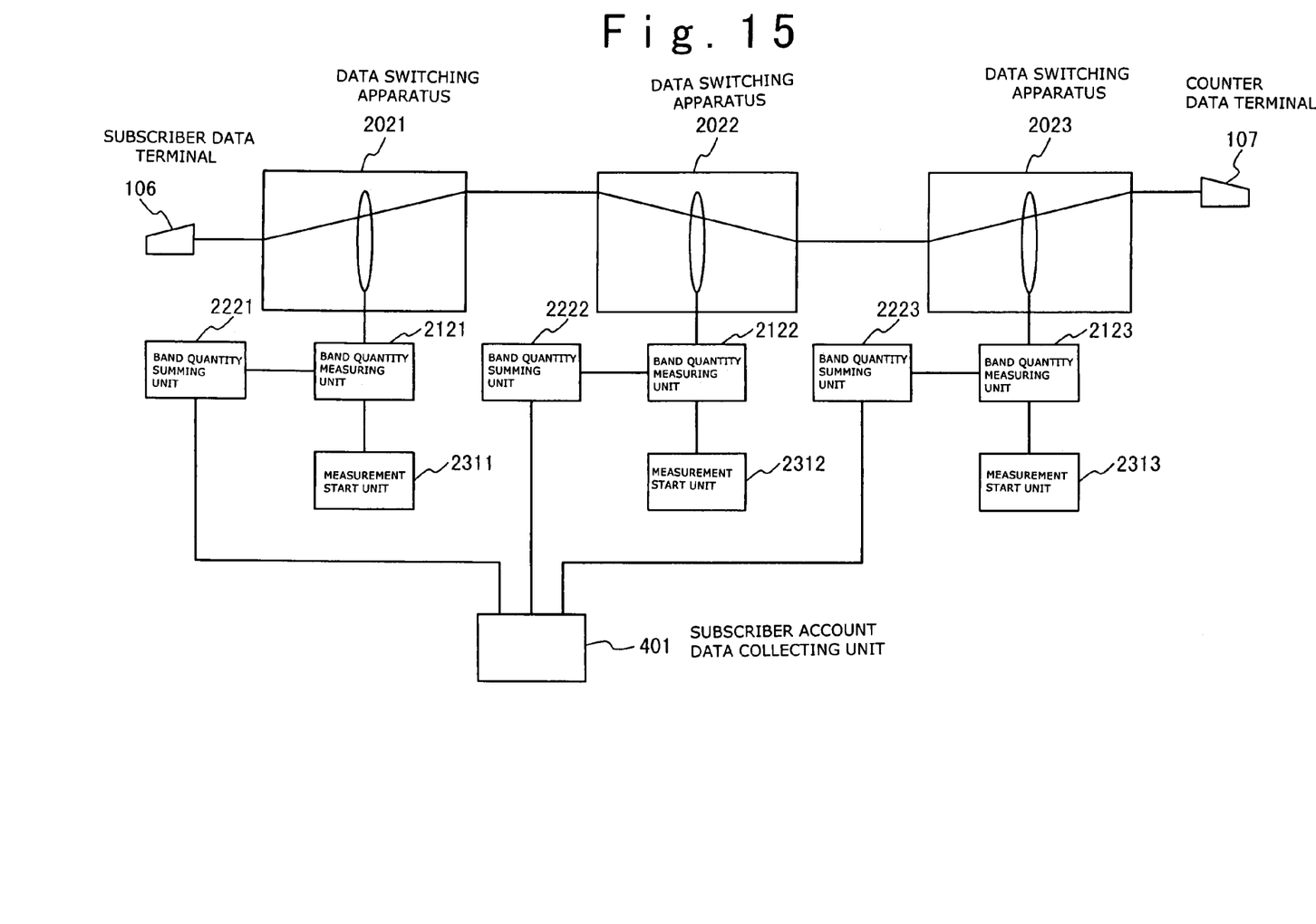
FIG. 15 shows the structure of the communication fee charging system according to the fifth embodiment of the present invention.

FIG. 15 shows the structure of the fee charging system according to the fifth embodiment of the present invention when the subscriber data from the subscriber data terminal 106 is connected with the counter data terminal 107 via the data switching apparatuses 2021, 2022 and 2023. In this case, the data switching apparatuses may be of a specific communication service company or different communication service companies. The account data is transferred from each of the occupied band quantity summing units 2121, 2122 and 2123 connected to the occupied band quantity measuring units 2021, 2022 and 2023 to a subscriber account data collecting unit 401 for calculation of the fee.

Figure 16:
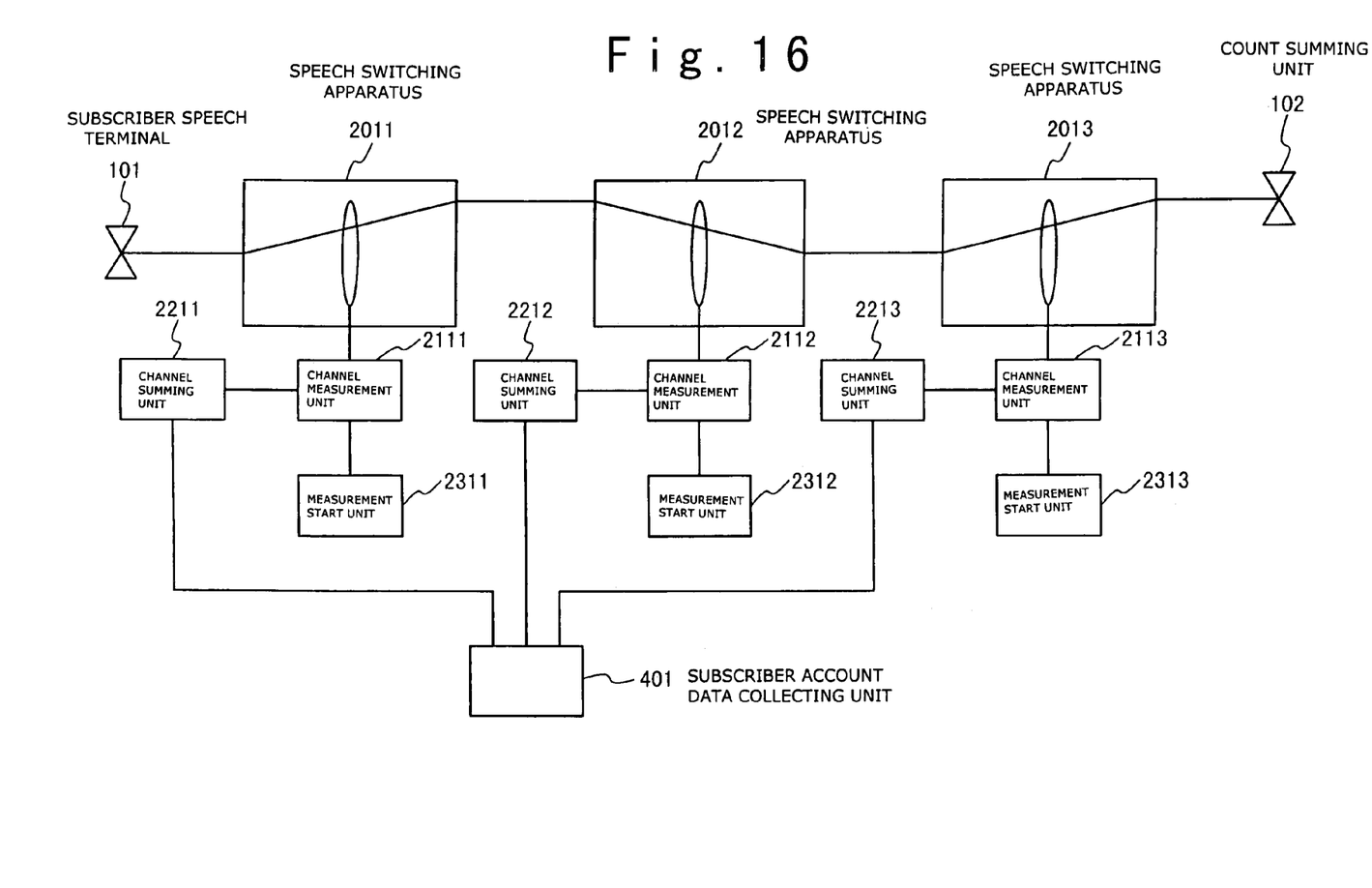
FIG. 16 shows the structure of a modification the fee charging system according to the sixth embodiment of the present invention.

FIG. 16 shows the structure of a modification the fee charging system according to the sixth embodiment of the present invention when the subscriber speech terminal 101 is connected with the counter speech terminal 102 via the speech switching apparatuses 2011, 2012 and 2013. In this case, the speech switching apparatuses may be of a specific communication service company or different communication service companies. The account data is transferred from each of the occupied channel summing units 2211, 2212 and 2213 connected to the occupied channel measuring units 2111, 2112 and 2113 to a subscriber account data collecting unit 401 for calculation of the fee.

It should be noted that in the above description, the same components are allocated with the same or similar reference numerals.

Also, the above embodiments and modification may be combined with each other in a scope with no contradiction.

As described above, according to the present invention, it is possible to determine the account data in accordance with the quantity of the system resources occupied by the call of the user, even if there is fluctuation of the number of calls in the line switching call while the calls are originated and then ended. This is because the start time of the call and the end time thereof are not observed but the system is adopted in which the quantity of transfer data is measured at the observation time.

Also, it is possible to determine the account data in accordance with the quantity of the system resources occupied by the call of the user, even if there is fluctuation of the quantity of transfer data in the line switching call while the calls are originated and then ended. This is because the start time of the call and the end time thereof are not observed but the system is adopted in which the quantity of transfer data is measured at the observation time.

Also, it is possible to determine the account data in accordance with the quantity of the system resources occupied by the call of the user in the line switching call and the packet switching call, because the observation for the account data for the line switching call and the packet switching call is carried out by the same system.

Also, it is possible to determine the account data in accordance with the use state of the switching apparatus and its accompanying units, when a line switching call is transmitted by a frame relay switching apparatus and or an ATM switching apparatus, because of it is possible to determine the account data in accordance with the quantity of the system resources occupied by the call of the user regardless of the kind of call.

What is claimed is:

1. A communication fee charging system comprising:
   a switching apparatus which connects a subscriber terminal with at least one counter terminal;
   a measuring unit connected to said switching apparatus to measure one of a number of channels and a band quantity occupied in the connection between said subscriber terminal and said at least one counter terminal in response to a measurement start signal, to output a measurement result;
   a summing unit connected to said measuring unit to sum the measurement result; and
   a generating unit connected to said measuring unit to output said measurement start signal to said measuring unit
   wherein said measuring unit measures the number of channels when a line switching call is originated from said subscriber terminal.

2. The communication fee charging system according to claim 1, wherein said generating unit outputs said measurement start signal periodically to said measuring unit.

3. The communication fee charging system according to claim 1, wherein said generating unit outputs said measurement start signal randomly to said measuring unit.

4. The communication fee charging system according to claim 1, wherein said measuring unit additionally measures said band quantity when a packet switching call is originated from said subscriber terminal.

5. The communication fee charging system according to claim 1, wherein said measuring unit scans channels or bands which are accommodated in said switching apparatus and are used currently at least, in response to said measurement start signal to measure one of the number of channels and said band quantity.

6. The communication fee charging system according to claim 1, wherein said subscriber terminal and said counter terminal are speech terminals.

7. The communication fee charging system according to claim 1, wherein said subscriber terminal and said counter terminal are data terminals.

8. The communication fee charging system according to claim 1, wherein a plurality of said switching apparatuses are provided between said subscriber terminal and said counter terminal,
   a set of said measuring unit, said summing unit and said generating unit is provided each of said plurality of switching apparatus,
   said communication fee charging system further comprises:
   a unit which collects the summation from each of said summing units of said sets.

9. A communication fee charging method comprising the steps of:
   (a) establishing a connection between a subscriber terminal and at least one counter terminal by a switching apparatus in a call from said subscriber terminal;
   (b) generating a measurement start signal;
   (c) measuring one of a number of channels and a band quantity occupied in the connection in response to said measurement start signal; and
   (d) summing the measurement result
   wherein said (c) measuring step comprises the step of:
   measuring the number of channels when a line switching call is originated from said subscriber terminal.

10. The communication fee charging method according to claim 9, wherein said (b) generating step comprises the step of:

generating said measurement start signal periodically.

11. The communication fee charging method according to claim 9, wherein said (b) generating step comprises the step of:

generating said measurement start signal randomly.

12. The communication fee charging method according to claim 9, wherein said (c) measuring step comprises the step of:

additionally measuring said band quantity when a packet switching call is originated from said subscriber terminal.

13. The communication fee charging method according to claim 9, wherein said (c) measuring step comprises the step of:

scanning channels or bands which are accommodated in said switching apparatus and are used currently at least, in response to said measurement start signal to measure one of the number of channels and said band quantity.

14. The communication fee charging method according to claim 9, wherein said subscriber terminal and said counter terminal are speech terminals.

15. The communication fee charging method according to claim 9, wherein said subscriber terminal and said counter terminal are data terminals.

16. The communication fee charging method according to claim 9, wherein said subscriber terminal is connected with said counter terminal via a plurality of said switching apparatuses, a set of said (b) generating step, said (c) measuring step and said (d) summing step is carried out in conjunction with each of said plurality of switching apparatus, said communication fee charging method further comprises the step of:

collecting the summation from each of said summing units of said sets.

* * * * *